United States Patent
Bruneau et al.

(10) Patent No.: US 11,801,727 B2
(45) Date of Patent: Oct. 31, 2023

(54) THERMAL MANAGEMENT SYSTEM FOR ELECTRIC VEHICLE

(71) Applicant: Taiga Motors Inc., Lasalle (CA)

(72) Inventors: Samuel Bruneau, Lasalle (CA); Paul Achard, Lasalle (CA); Marc-Olivier Gagnon, Montreal (CA)

(73) Assignee: Taiga Motors Inc., Lasalle (CA)

( * ) Notice: Subject to any disclaimer, the term of this patent is extended or adjusted under 35 U.S.C. 154(b) by 0 days.

(21) Appl. No.: 17/950,584

(22) Filed: Sep. 22, 2022

(65) Prior Publication Data
US 2023/0018360 A1   Jan. 19, 2023

Related U.S. Application Data

(63) Continuation of application No. 17/091,625, filed on Nov. 6, 2020, now Pat. No. 11,485,192.
(Continued)

(51) Int. Cl.
*B60H 1/00* (2006.01)
*H01M 10/6568* (2014.01)
(Continued)

(52) U.S. Cl.
CPC ...... *B60H 1/00278* (2013.01); *H01M 10/625* (2015.04); *H01M 10/6552* (2015.04);
(Continued)

(58) Field of Classification Search
CPC ...... B60H 1/00278; B60H 2001/00128; B60H 2001/00171; B60H 2001/00307;
(Continued)

(56) References Cited

U.S. PATENT DOCUMENTS

| 5,678,760 A | 10/1997 | Muso |
| 5,731,568 A | 3/1998 | Malecek |

(Continued)

FOREIGN PATENT DOCUMENTS

WO   2021/084520   5/2021

OTHER PUBLICATIONS https://www.youtube.com/watch?v=Z-TbgZvYBpM&ab_channel=dubedubz, Dec. 6, 2016.
(Continued)

*Primary Examiner* — Tho V Duong
*Assistant Examiner* — Raheena R Malik
(74) *Attorney, Agent, or Firm* — Dicke, Billig & Czaja, PLLC

(57) ABSTRACT

One example provides a thermal management system for an electric vehicle including a pump to pump a thermal transfer fluid through a number of circulation loops, an electric heater to heat the thermal transfer fluid, a heat exchanger to expel heat from the thermal transfer fluid, a number of valves, and a number of fluid pathways fluidically interconnecting the pump, heater, heat exchanger and valves. The valves being controllable to a number of different positions to form the number of circulation loops, the number of circulation loops including a battery heating circulation loop extending through the heater for heating a battery pack of the vehicle, a secondary components cooling circulation loop extending through the heat exchanger to cool secondary components of the vehicle, including a motor and a motor controller, and a battery cooling circulation loop extending through the heat exchanger to cool the battery pack.

18 Claims, 8 Drawing Sheets

Related U.S. Application Data

(60) Provisional application No. 62/931,903, filed on Nov. 7, 2019.

(51) Int. Cl.
*H01M 10/6552* (2014.01)
*H01M 10/625* (2014.01)

(52) U.S. Cl.
CPC .................. *H01M 10/6568* (2015.04); *B60H 2001/00128* (2013.01); *B60H 2001/00171* (2013.01); *B60H 2001/00307* (2013.01); *H01M 2220/20* (2013.01)

(58) Field of Classification Search
CPC ........... H01M 10/625; H01M 10/6552; H01M 10/6568; H01M 2220/20
USPC ....................................................... 180/339
See application file for complete search history.

(56) References Cited

U.S. PATENT DOCUMENTS

| | | | |
|---|---|---|---|
| 8,402,776 B2 | 3/2013 | Johnston et al. | |
| 9,016,080 B2 | 4/2015 | Brodie et al. | |
| 9,533,544 B2 | 1/2017 | Johnston | |
| 10,046,617 B2 | 8/2018 | Smith et al. | |
| 10,125,662 B2 | 11/2018 | Onishi | |
| 10,315,519 B2 | 6/2019 | Sakata | |
| 10,773,586 B2 * | 9/2020 | Lucke | H01M 10/6568 |
| 2009/0280395 A1 | 11/2009 | Nemesh | |
| 2010/0025006 A1 | 2/2010 | Zhou | |
| 2011/0296855 A1 | 12/2011 | Johnston | |
| 2015/0101789 A1 | 4/2015 | Enomoto | |
| 2015/0217623 A1 | 8/2015 | Hatakeyama et al. | |
| 2016/0229282 A1 | 8/2016 | Hettrich | |
| 2016/0272043 A1 | 9/2016 | Cheng | |
| 2016/0272044 A1 | 9/2016 | Cheng | |
| 2017/0158081 A1 | 6/2017 | Kim | |
| 2018/0115029 A1 | 4/2018 | Ren et al. | |
| 2018/0154734 A1 | 6/2018 | Lee | |
| 2018/0154782 A1 | 6/2018 | Lee | |
| 2018/0178615 A1 | 6/2018 | Xia et al. | |
| 2018/0290547 A1 | 10/2018 | Myers et al. | |
| 2019/0263252 A1 | 8/2019 | Hettrich et al. | |
| 2020/0025006 A1 | 1/2020 | D'ambruoso | |
| 2020/0031191 A1 | 1/2020 | Oh | |
| 2020/0047586 A1 * | 2/2020 | Gonze | B60H 1/3227 |
| 2020/0140037 A1 | 5/2020 | Haavikko et al. | |
| 2021/0080027 A1 | 3/2021 | Schoeneman | |
| 2021/0138868 A1 | 5/2021 | Bruneau et al. | |
| 2022/0009589 A1 | 1/2022 | Matsushita | |
| 2022/0017181 A1 | 1/2022 | Suzuki et al. | |
| 2022/0063764 A1 | 3/2022 | Matsushita | |
| 2022/0111929 A1 | 4/2022 | Matsushita | |

OTHER PUBLICATIONS http://advantage-environment.com/transport/introducing-the-electric-snowmobile/ (accessed via https://web.archive.org/ to obtain properly displayed images), Mar. 2011.
https://newatlas.com/clean-snowmobile-challenge-2011/18121/, Mar. 17, 2011.
www.icatpro.com/electric-snowmobile-icatpro-zero-emission-technology/, Nov. 30, 2017.
Per Trostemo, "The First Electric Snowmobile", Green Solutions from Sweden, pp. 100-101, Nov. 18, 2015.
https://www.youtube.com/watch?v=rl8TY5DQk_4, published Apr. 23, 2010.
Mathew Brown, et al., "Review of Zero-Emission Utah State Snowmobile", Utah State University Electric Snowmobile Team, 13 pgs., Mar. 2007.
Marcia Goodrich, "Clean Snowmobile Challenge on Track for March", Published Jan. 24, 2012, https://www.mtu.edu/news/stories/2012/january/clean-snowmobile-challenge-track-for-march.html.
Snowbird: "Austrian Electric Snowmobile Reaches 120kph", Technologi Vehicles, Mar. 3, 2013. https://technologicvehicles.com/en/green-transportation-news/2340/snowbird-cette-motoneige-electrique-autrichie#.YEKIETZYYdU.
"Snowbird", FH-Joanneum University of Applied Sciences, Nov. 2011-Feb. 2013, https://www.fh-joanneum.at/en/projekt/snowbird/.
https://www.youtube.com/watch?v=mLlaLhXoFUs, Snowmobile Spritztour, Published Jan. 25, 2015.
https://www.motoneigeauquebec.com/forum/content.php?518-Motoneige-%E9lectrique-version-Su%E9doise-et-sportive, published Dec. 3, 2013.
https://sverigesradio.se/sida/artikel.aspx?programid=109&artikel=5033462, Soruman, Mar. 24, 2012.
https://www.svt.se/nyheter/lokalt/vasterbotten/el-skotern-ska-satta-storuman-pa-kartan, Jan. 20, 2015.
Non-Final Office Action dated Aug. 8, 2022 in U.S. Appl. No. 17/091,625.
Notice of Allowance dated Sep. 15, 2022 in U.S. Appl. No. 17/091,625.

* cited by examiner

THERMAL MANAGEMENT SYSTEM FOR ELECTRIC VEHICLE

CROSS-REFERENCE TO RELATED APPLICATIONS

The present application is a continuation application of U.S. patent application Ser. No. 17/091,625, filed Nov. 6, 2020, and claims priority to U.S. Ser. No. 62/931,903 filed Nov. 7, 2019, both of which are incorporated herein by reference.

BACKGROUND

Powersport vehicles, such as all-terrain vehicles (ATVs), personal water craft (PWC), and snowmobiles, for example, continue to grow in popularity. Due to their quieter, cleaner, and more efficient power drive systems, electric powersport vehicles provide an alternative to powersport vehicles powered by traditional internal combustion engines.

DETAILED DESCRIPTION

Figure 1:
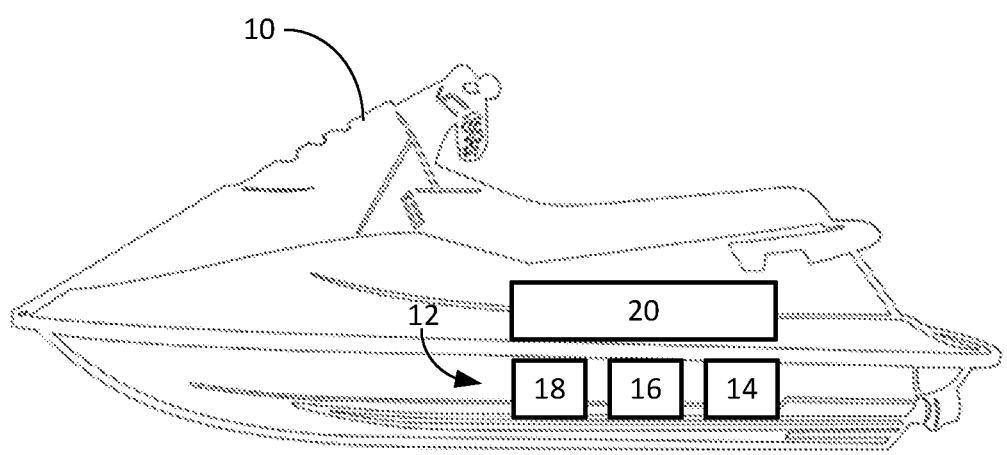
FIG. 1 generally illustrates an electric power sport vehicle including a thermal management system, according to one example of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Powersport vehicles, such as all-terrain vehicles (ATVs), personal water craft (PWC), and snowmobiles, for example, continue to grow in popularity. Traditionally, such powersport vehicles have been powered by internal combustion engines which emit exhaust gases (e.g., carbon dioxide and nitrous oxide) that contribute to greenhouse gases and other forms of pollution, and which generate high noise levels under certain operating conditions.

As a result, electric powersport vehicles represent a promising alternative to internal combustion engine-driven powersport vehicles. Powersport vehicles employing electric powertrains are quieter, cleaner, and also more energy-efficient than traditional powersport vehicles employing internal combustion engines. However, in order to be successful, electric powersport vehicles need to meet customers' expectations with regard to performance, range, reliability, and cost.

Typical electric powertrains of electric powersport vehicles include a battery system, one or more electrical motors with corresponding electronic motor drives, and various auxiliary systems. Unlike automobiles, powersport vehicles are often operated at 'full-throttle" for extended periods of time. However, when operating at high discharge rates, batteries generate large amounts of heat. While increased operating temperatures may improve battery performance in the form of increase power output, high temperature operation can potentially be damaging and reduce battery life. Conversely, battery power output decreases when operating at cold temperatures. As such, in order to optimize battery performance and life, it is desirable to operate batteries within an optimal operating temperature range.

For electric automobiles, liquid-based heat transfer systems (e.g., glycol-based systems) have been developed to provide thermal management of electric powertrain components, including batteries. However, such systems typically include complicated piping systems having large numbers of control valves and multiple heat exchangers. While such systems are effective at managing thermal loads of powertrain components, they are complicated, expensive, and heavy, making them unsuitable for use with electric powersport vehicles. While liquid-based heat transfer systems have employed in electric powersport vehicles to provide thermal management of motors and corresponding electronic controllers, battery systems have traditionally been air-cooled, which greatly reduces the complexity of the heat transfer system and the battery systems and enables the use of commercially available generic battery modules.

As described herein, a liquid-based thermal management system (TMS) for electric powersport vehicles is disclosed. In examples, the TMS employs a pump, a heater, a heat exchanger, and a piping system employing a pair of 3-way valves, where each which are controllable based on temperatures of powertrain components to provide a number of different circulation paths (or circulation loops) to enable different modes of operation including an active battery heating mode, a passive battery heating mode (in conjunction with a motor/controller cooling), and an active system cooling mode (including battery and motor/controller cooling). The TMS, in accordance with the present disclosure, maintains the batteries within an acceptable operating temperature range over a wide environmental temperature range, maintains motors/controllers within target temperature ranges, while also being lightweight, thereby enabling acceptable performance of the corresponding electric powersport vehicle over a wide range of conditions to satisfy consumer expectations.

FIG. 1 is a diagram generally illustrating an electrical vehicle 10 in which a TMS, in accordance with the present disclosure, may be employed. In one example, electric powersport vehicle 10 is an electric powersport vehicle, such as a personal watercraft (PWC), as illustrated by FIG. 1. Although electric power sport vehicle 10 is illustrated as being a personal watercraft (PWC), in other cases, the TMS may be employed in any number of electric power sport vehicles, such as snowmobiles and ATVs, for example. In one example, vehicle 10 includes an electric power train 12 including at least one motor 14 having a corresponding electronic motor controller 16, and a battery system 18. Vehicle 10 further includes a TMS 20, in accordance with the present application, for thermal management of electrical power train 12, as will be described in greater detail below.

Figure 2:
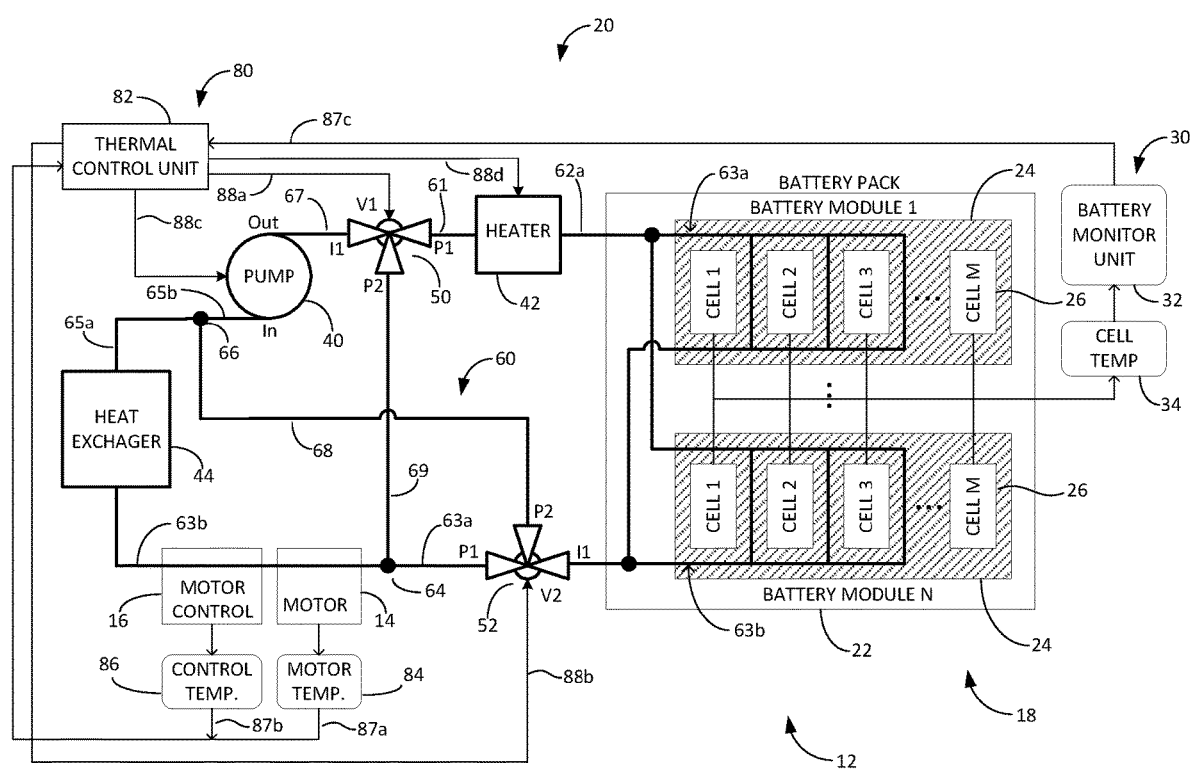
FIG. 2 is a block and schematic diagram illustrating a thermal management system, according to one example of the present disclosure.

FIG. 2 is a block and schematic diagram illustrating an example implementation of TMS 20, such as employed by PWC 10 of FIG. 1, in relation to components of electric powertrain 12. In one example, battery system 18 includes a battery pack 22 including a number of battery modules 24, illustrated as battery modules 1 to N, with each battery module 24 including a number of battery cells 26, illustrated as battery cells 1 to M. In examples, the battery cells 24 of each battery module 26 are electrically connected with one another, with the battery modules 26, in-turn, being electrically connected with one another to form battery pack 22. In one example, each battery cell 24 comprises a lithium-ion battery cell, although any number of other suitable battery chemistries and configurations may be employed.

In one example, battery system 18 includes a battery management system 30 including a battery monitoring unit 32 and a number of temperature sensors 34 for monitoring the operation temperatures of cells 26 of each battery module 24. In one examples, temperatures sensors 34 include at least one temperature sensor for each battery cell 26 of each battery module 24. In other examples, temperature sensors 34 may include fewer temperature sensors than one for each battery cell 26. In examples, in addition to monitoring a temperature of battery cells 26 of battery modules 24 via temperature sensors 34, battery monitoring unit 32 monitors other operating conditions and parameters of battery pack 22, such as a voltage, current, and charge of each battery cell 26, to name a few.

In one example, as illustrated, TMS 20 includes a pump 40 having an input port (In) and an output port (Out), an electric heater 42, and a heat exchanger 44. In examples, heat exchanger 44 may be a fluid-to-air heat exchanger (e.g., when employed in an ATV), a fluid-to-fluid heat exchanger (e.g., when employed in a PWC), and a fluid-to-snow heat exchanger (e.g., when employed in a snowmobile). Any suitable type of lightweight heat exchanger may be employed. TMS 20 further includes a first controllable 3-way valve (V1) 50 having an input port, I1, and two valve positions (or output ports) P1 and P2, and a second controllable 3-way valve (V2) 52 having an input port, I1, and two valve positions (or output ports) P1 and P2. In examples, first valve V1 50 may be referred to as a "battery bypass valve" and second valve V2 may be referred to as a "cooling bypass valve".

A system of fluid pathways 60 interconnects pump 40, heater 42, heat exchanger 44, and first and second valves V1 50 and V2 52, with the positions of first and second valves V1 50 and V2 52 controllable to form a number of flow paths (or circulation loops) for communicating a thermal transfer fluid (e.g., a glycol-based fluid, although any number of suitable thermal transfer fluids may be employed) through motor 14, motor controller 16, and battery pack 22 to transfer heat to and/or remove heat therefrom according to a number of different operational modes of TMS 20 which may be selected during operation of electric powersport vehicle 10. It is noted that more than one motor 14 and corresponding controller 16 may be cooled by TMS 20.

In one example, the system of fluid pathways 60 includes a number of pipes, where such pipes may be made of any suitable material (e.g., plastic, copper, aluminum). In one example, as illustrated, a pipe 61 provides a fluidic communication path between output port P1 of first valve V1 and heater 42, a pipe 62a provides a fluidic communication path between heater 42 and battery pack 22, and a pipe 62b provides a fluidic communication path between batter pack 22 and input port I1 of second valve V2, where pipes 62a and 62b respectively serve as an input and output paths for communicating heat transfer fluid through battery pack 22.

In one example, piping arrangements for communicating fluid through battery modules 24, such as illustrated by battery module piping arrangements 63a and 63b, are integral to each battery module 24, where input and output pipes 62a and 62b couple to integral battery module piping arrangements 63a and 63b. In other cases, battery module piping arrangements 63a and 63b may be separate from battery modules 24. In other cases, some portions of battery module piping arrangements 63a and 63b may be integral to battery modules 24 while some portions may be separate from battery modules 24. In some case, as illustrated, battery module piping arrangements 63a and 63b are implemented to communicate fluid between adjacent pairs of battery cells 26. In some examples, not illustrated herein, battery module piping arrangements 63a and 63b include thermal transfer plates disposed between each pair of battery cells 26, where heat transfer fluid is circulated through the heat transfer plates to transfer heat to/from adjacent battery cells 26.

In one example, a pipe 63a extends from first output port P1 of second valve V2 and a pipe tee 64, and a pipe 63b extends from tee 64 through motor 14 and motor controller 16 to heat exchanger 44. A pipe 65a extends from heat exchanger 44 to a pipe tee 66, and a pipe 65b extends from tee 66 to the input port of pump 40. A pipe 67 extends between the output port of pump 40 and the input port I1 of first controllable valve V1 50. A pipe 68 forms a fluidic path between second output port P2 of second controllable valve V2 52 and pipe tee 66 proximate to the input port of pump 40, and a pipe 69 forms a fluidic path between second output port P2 of first controllable value V1 50 and pipe tee 64 between second valve 52 and motor 14.

In one example, thermal management system 20 further includes a thermal control system 80 including a thermal control unit 82 and temperature sensors 84 and 86 to respectively provide operating temperatures of motor 14 and motor controller 16. In one example, thermal control unit 82 receives temperature signals from motor and controller temperature sensors 84 and 86 via signal lines 87a and 87b, and heating/cooling requests from battery monitoring unit 32 (as will described in greater detail below, for example, see FIG. 6) via signal line 87c. In one example, thermal control unit 82 respectively controls the operation of first and second controllable valves 50 and 52 (e.g., the position of valves 50 and 52) via control lines 88a and 88b, the operation of pump 40 via control line 88c, and the operation of heater 42 via control line 88d. In some examples, battery management system 30 may be separate from thermal control system 80. In other examples, all or portions of battery management system 30 may be included as part of thermal control system 80.

As will be described in greater detail below, based on operating temperatures of motor 14 and electronic motor controller 16 provided by motor and controller temperature sensors 84 and 86, and based on heating and cooling requests from battery management system 30 (which are based on the temperatures of cells 26 provided by cell temperature sensors 34, and on charge levels of cells 26, for example, see FIG. 6), thermal control unit 82 controls the operation of pump 40 (e.g., on/off), the operation of heater 42 (e.g., on/off), and the positions of first and second controllable valves V1 50 and V2 52 to provide various operating modes (e.g., heating and cooling modes) for controlling the operating temperatures of motor 14, electronic motor controller 16, and battery pack 22 to maintain such temperatures at acceptable levels.

In examples, as will be described below, thermal management system 20 includes an active battery heating mode (see FIG. 3), a passive battery heating mode (see FIG. 4), and a full cooling mode (see FIG. 5). It is also noted that thermal management system 20 includes a standby mode of operation, such as may be illustrated by FIG. 2, where pump 40 and heater 42 are deactivated and no thermal transfer fluid is circulated through fluid pathways 60.

Figure 3:
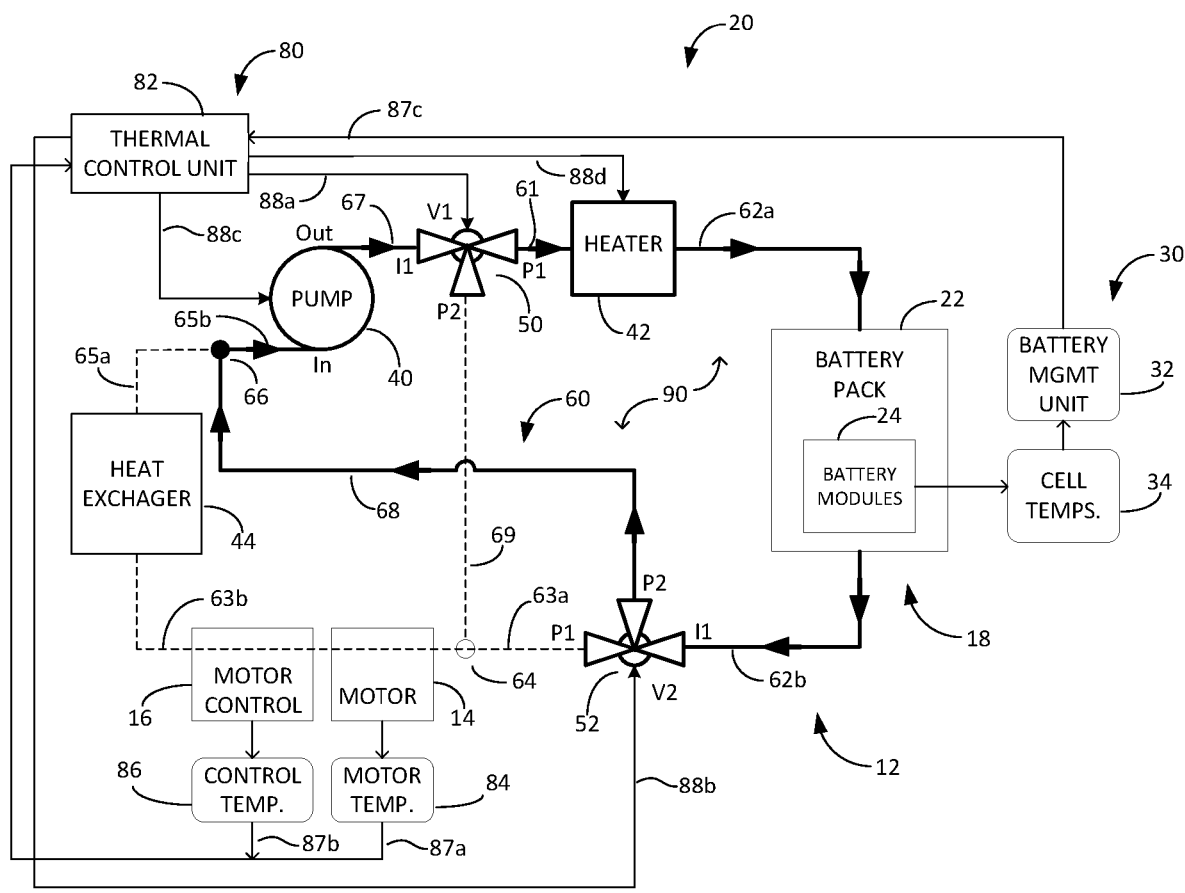
FIG. 3 is a block and schematic diagram illustrating a thermal management system operating in an active battery heating mode, according to one example of the present disclosure.

With reference to FIG. 3, in one example, thermal management system 20 provides an active battery heating mode of operation by activating pump 40 and heater 42, by switching controllable valve V1 50 to a first position to direct thermal transfer fluid from input port I1 to first output port P1, and by switching controllable valve V2 52 to a second position to direct thermal transfer fluid from input port I1 to second output port P2 to configure fluid pathways 60 to form a circulation loop 90 of heated thermal transfer fluid though battery pack 22. In active battery heating mode, heated thermal transfer fluid is circulated by pump 40 via circulation loop 90 through battery pack 22 via heater 42 so as to heat battery pack 22 while bypassing motor 14, electronic motor controller 16, and heat exchanger 44. In one example, as illustrated, in active battery heating modes, pipe segments 61, 62*a*, 62*b*, 68, 65*b*, and 67 (as well as piping internal to battery pack 22) are employed to form circulation loop 90 to circulate thermal transfer fluid (as indicated by bold lines and directional arrows), while pipe segments 63*a*, 63*b*, 65*a*, and 69 are bypassed (as indicated by dashed lines).

Figure 4:
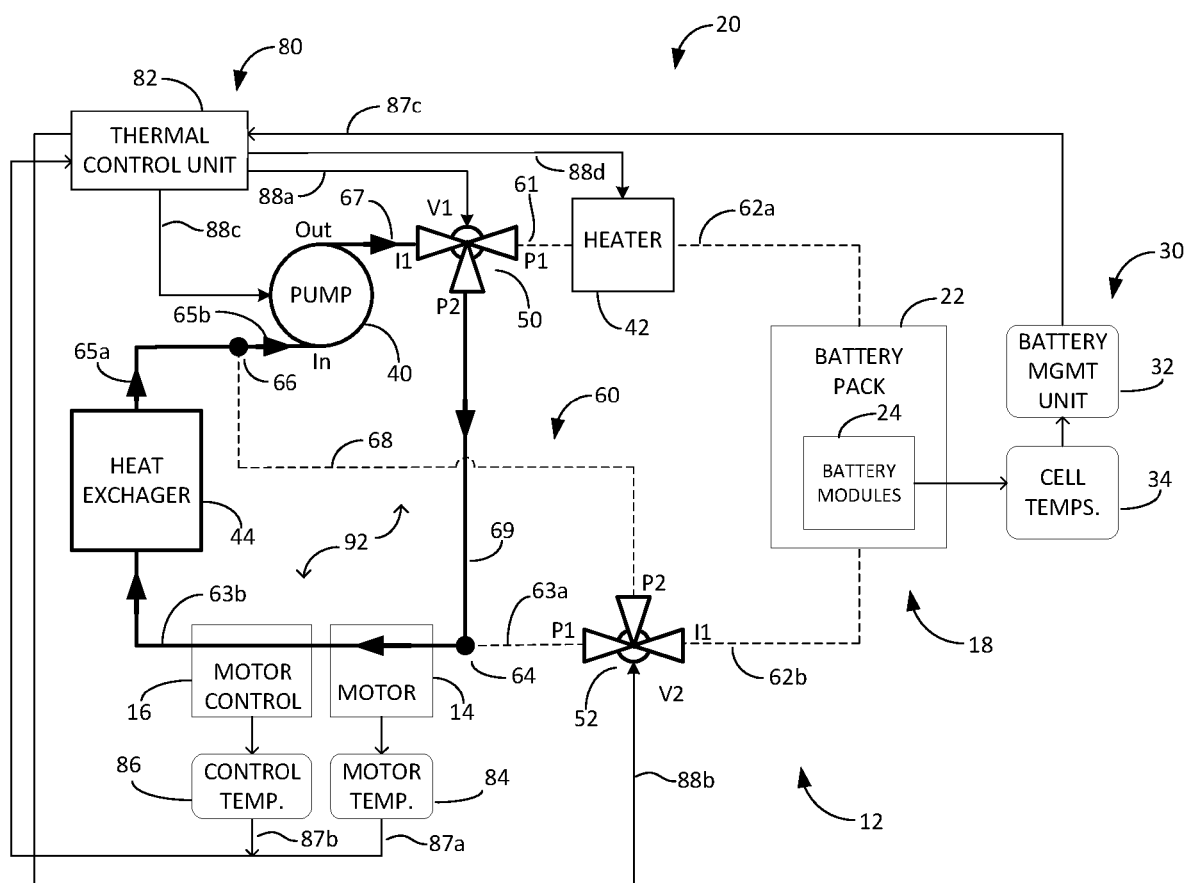
FIG. 4 is a block and schematic diagram illustrating a thermal management system operating in a passive battery heating mode, according to one example of the present disclosure.

With reference to FIG. 4, in one example, thermal management system 20 provides a passive battery heating mode of operation (or active motor cooling mode) by activating pump 40, by switching controllable valve V1 50 to a first position to direct thermal transfer fluid from input port I1 to second output port P2, and by switching controllable valve V2 52 to an off position to configure fluid pathways 60 to form a circulation loop 92 to circulate thermal transfer fluid through motor 14, electronic motor controller 16, and heat exchanger 44. In passive battery heating mode, heater 42 is deactivated and battery pack 22 is bypassed so that battery pack 22 passively warms via cell discharge, while motor 12 and electronic motor controller 16 are cooled by circulating heat transfer fluid through heat exchanger 44. In one example, as illustrated, in passive battery heating mode, pipe segments 67, 69, 63*b*, 65*a*, and 65*b* are employed to form circulation loop 92 to circulate thermal transfer fluid (as indicated by bold lines and directional arrows), while pipe segments 61, 62*a*, 62*b*, 63*a*, and 68 are bypassed (as indicated by dashed lines).

Figure 5:
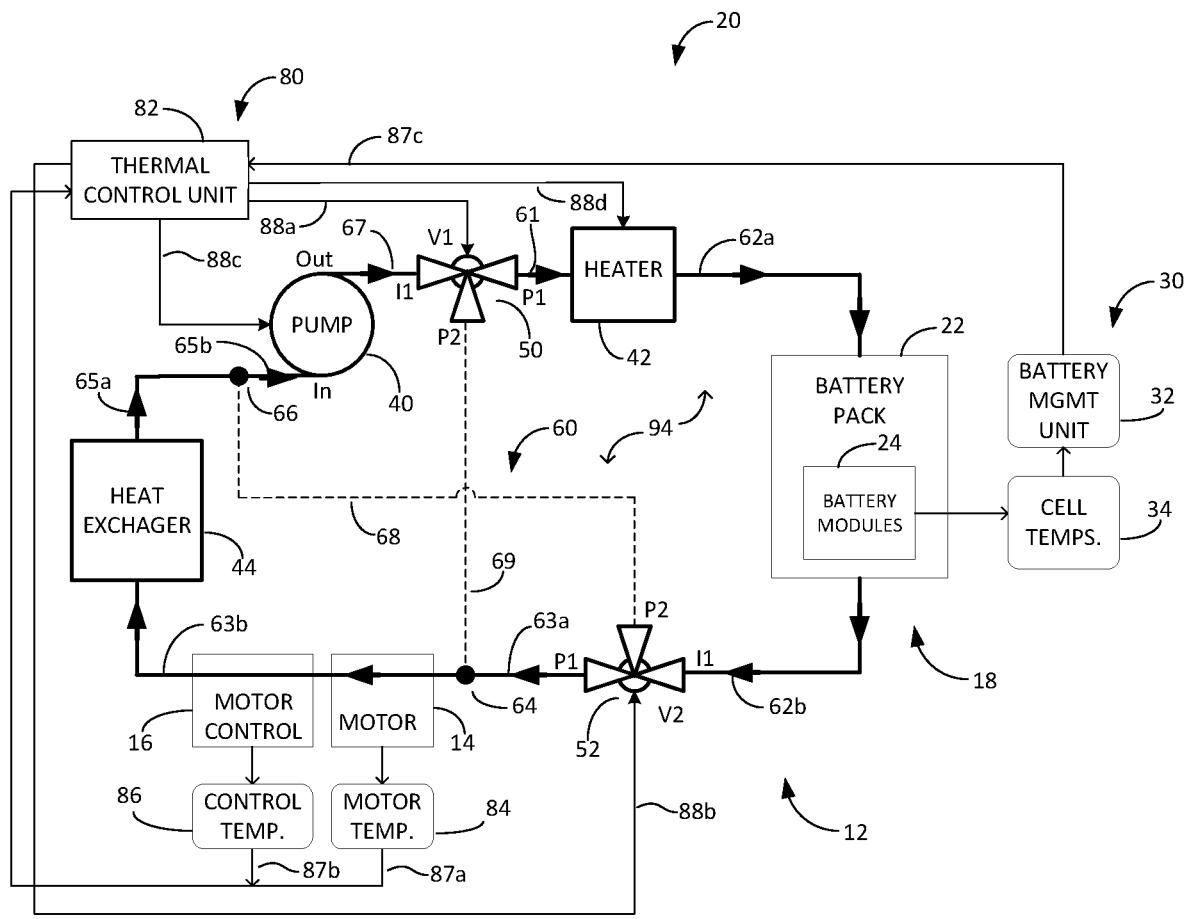
FIG. 5 is a block and schematic diagram illustrating a thermal management system operating in a full cooling mode, according to one example of the present disclosure.

With reference to FIG. 5, in one example, thermal management system 20 provides a full cooling mode of operation by activating pump 40, by switching controllable valve V1 50 to a first position to direct thermal transfer fluid from input port I1 to second output port P1, and by switching controllable valve V2 52 to a first position to direct thermal transfer fluid from input port I1 to second output port P2 to configure fluid pathways 60 to form a circulation loop 94 to circulate thermal transfer fluid through battery pack 22, motor 14, electronic motor controller 16, and heat exchanger 44. In full cooling mode, heater 42 is deactivated so that battery pack 22, motor 12, and electronic motor controller 16 are cooled by circulating heat transfer fluid through heat exchanger 44. In one example, as illustrated, in active cooling mode, pipe segments 67, 61, 62*a*, 62*b*, 63*a*, 63*b*, 65*a*, and 65*b* (as well as piping internal to battery pack 22) are employed to form circulation loop 94 to circulate thermal transfer fluid (as indicated by bold lines and directional arrows), while pipe segments 68 and 69 are bypassed (as indicated by dashed lines).

Figure 6:
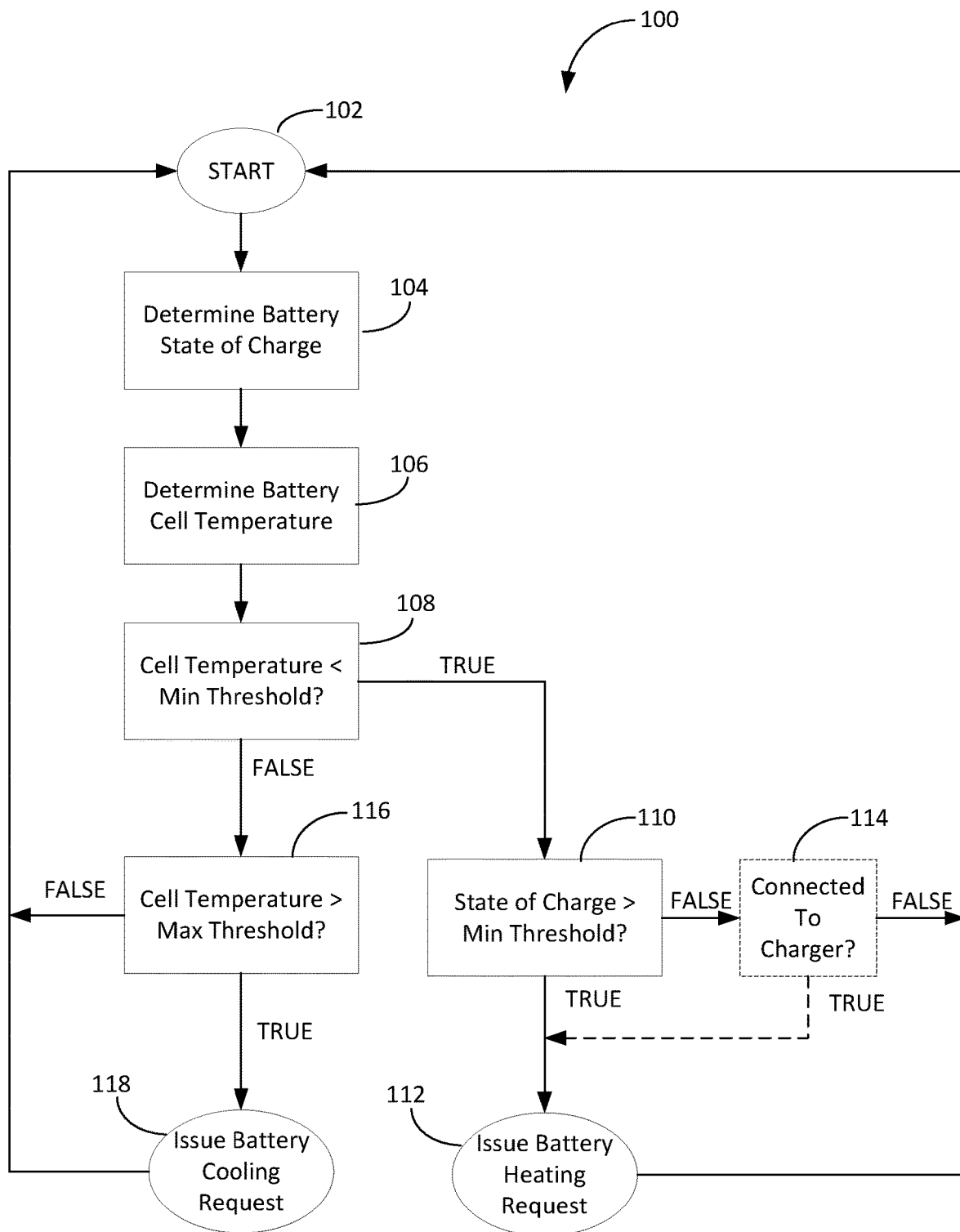
FIG. 6 is a flow diagram illustrating an example operation of a thermal management system, in accordance with the present disclosure.

FIG. 6 is a flow chart generally illustrating a process 100 for operating a thermal management system, such as TMS 20, according to one example of the present disclosure. In particular, method 100 illustrates an example for determining initiation of a heating request or a cooling request for battery pack 22. According to examples, process 100 may be performed by battery management system 30 where, as described above, portions of battery management system 30 may be implemented as part of thermal control system 80.

Process 100 begins at 102. At 104, process 100 determines a state of charge of battery pack 22. In one example, to determine a state of charge of battery pack 22, a state of charge is determined for each cell 26 of each battery module 24 of battery pack 22. In one example, a state of charge of each battery cell 26 is determined by battery management unit 32 by monitoring a voltage and current level of each battery cell to determine amp-hours remaining. In other examples, other suitable techniques may be employed to measure the state of charge of battery pack 22. In one example, battery management unit 32 determines a state of charge of each battery cell 26 of each battery module 24. In another case, battery management unit 32 determines an average state of charge of one or more groups of battery cells 26 within each battery module 24. In other examples, battery management unit 32 determines a state of charge of each battery module 24, where such state of charge is an average of the state of charge of each corresponding battery cell 26. In other examples, battery management unit 32 determines a state of charge of battery pack 22 by determining an average state of charge of each battery module 24.

At 106, process 100 determines a temperature of battery pack 22. In one example, as illustrated, to determine the temperature of battery pack 22, a temperature is determined for each battery cell 26 of each battery module 24 of battery pack 22, such as via temperature sensors 34. In one example, temperature sensors 34 include at least one temperature sensor for each battery cell 26 of each battery module 24. In one example, battery management unit 32 measures the temperature of each individual battery cell 24. In another case, battery management unit may determine an average temperature of one or more groups of battery cells 26 of each battery module 24. In another example, battery management unit 32 may determine a temperature of each battery module 24, where such temperature is an average of the temperatures of each corresponding battery cell 26. In another case, a temperature of battery pack 22 is determined based on an average of the temperatures of each battery module 24.

At 108, process 100 queries whether the temperature of battery pack 22 is less than a minimum threshold temperature. In one example, as illustrated, process 100 queries whether the temperature of any battery cell 26 within battery pack 22 is less than a minimum threshold temperature. In one example, such minimum threshold temperature is 10 degrees Celsius. In other cases, any suitable minimum threshold temperature may be employed. In one example, in lieu of determining whether any battery cell 26 temperature is below a minimum threshold temperature, the temperature of each battery module 24 (e.g., an average temperature of the corresponding battery cells 26) is compared to the minimum threshold temperature. In other examples, in lieu of determining whether any battery cell 26 temperature is below a minimum threshold temperature, the temperature of each battery pack 22 (e.g., an average temperature of all battery cells 26 within battery pack 22) is compared to the minimum threshold temperature.

If the answer to the query at 108 is TRUE, meaning that the temperature of at least one cell temperature is less than the minimum threshold temperature, process 100 proceeds to 110, where, in one example, the state of charge of each battery cell 26 is compared to a minimum threshold charge. Similar to that described above with regard to cell temperatures, in some examples, rather than comparing a state of charge of each battery cell 26 to a minimum threshold charge, an average state of charge of each battery module 24 may be compared to the minimum threshold charge, or an average state of charge of battery pack 22 may be compared to the minimum threshold charge value. In one example, a minimum state of charge is 5% of full charge. In other cases, any suitable value for state of charge may be employed.

Figure 7:
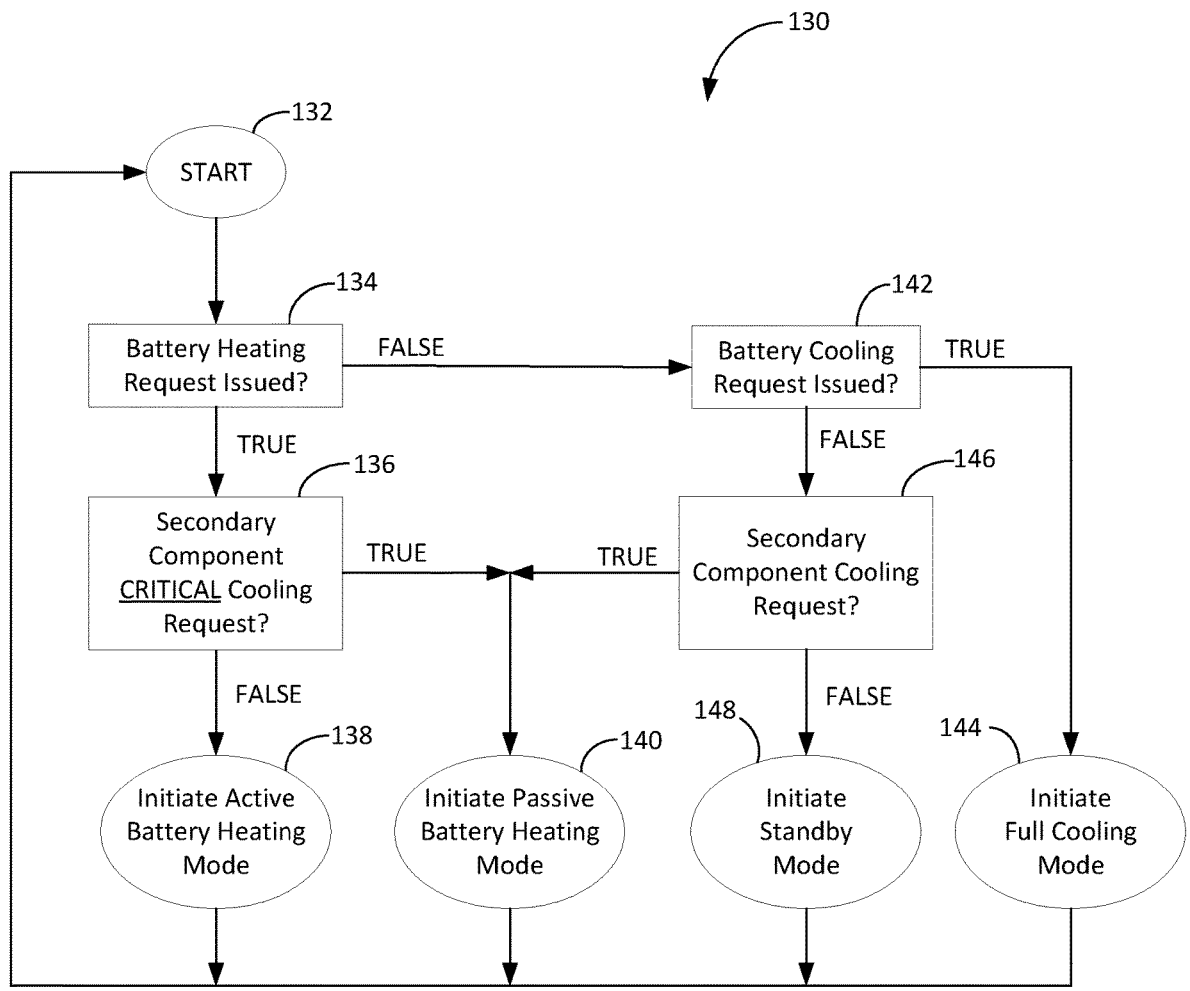
FIG. 7 is a flow diagram illustrating an example operation of a thermal management system, in accordance with the present disclosure.

If the answer to the query at 110 is TRUE, meaning that state of charge of each battery cell (or, in other examples, the charge of each battery module 24 or battery pack 22) is greater than the minimum threshold charge value, process 100 proceeds to 112, where battery management unit 32 issues a battery heating request to thermal control unit 82 (see FIG. 7). If the answer to the query at 110 is FALSE, meaning that the state of charge of at least one battery cell 26 (or, in other examples, the charge of any battery module 24 or battery pack 22) is less than the minimum threshold charge value, process 100 returns to 102. In other words, in one example, as illustrated, a battery heating request is not issued when under low temperature and low state of charge conditions to avoid over-discharge at low temperatures.

In one example, process 100 may optionally include a query at 114 to determine whether the battery is connected to a charger. If the answer to such query at 114 is TRUE, meaning that the battery is connected to a charger, process 100 proceeds to 116 where a heating request is issued. Under such conditions, the battery may avoid over-discharge at low temperatures by drawing external power from the charger. If the answer to the query at 114 is FALSE, meaning that the battery is not connected to a charger, process 100 proceeds to 102.

If the answer to the query at 108 is FALSE, meaning that the temperature of each battery cell 26 is greater than the minimum threshold temperature, process 100 proceeds to 116. At 116, process 100 queries whether the temperature of any battery cell 26 within battery pack 22 (or, in other examples, the temperature of any battery module 24 or battery pack 22) is greater than a maximum threshold temperature. In one example, such maximum threshold temperature is 40 degrees Celsius. In other cases, any suitable maximum threshold temperature may be employed. If the answer to the query at 116 is TRUE, process 100 proceeds to 118

If the answer to the query at 116 is TRUE, meaning that temperature of at least one battery cell (or, in other examples, the temperature of any battery module 24 or the temperature of battery pack 22) is greater than the maximum threshold temperature, process 100 proceeds to 112, where battery management unit 32 issues a battery cooling request to thermal control unit 82 (see FIG. 7). If the answer to the query at 116 is FALSE, meaning that the temperature of each battery cell (or, in other examples, the temperature of each battery module 24 or battery pack 22) is less than the maximum threshold temperature, process 100 returns to 102 to continue monitoring the operating conditions of battery pack 22.

FIG. 7 is a flow chart generally illustrating a process 130 of operating a thermal management system, such as TMS 20, according to one example of the present disclosure. Process 130 begins at 132. At 134, queries whether a battery heating request has been issued (see, for example, 112 in FIG. 6). If a heating request has been issued, process 130 proceeds to 136 where it is queried whether a "secondary component" critical cooling request condition exists. As used herein, the term "secondary component" refers to components of powertrain 12 other than battery pack 22, such as motor 12, electronic motor controller 14, and other electronic equipment, for example. In one example, a secondary component critical cooling request condition exists if a temperature of any second component exceeds a critical cooling threshold temperature (also referred to as a thermal cutback temperature). In one example, such a thermal cutback temperature may be 100 degrees Celsius. In other examples, other suitable thermal cutback temperature values may be employed. In examples, secondary component temperatures are provided for motor 14 and electronic motor controller 16 by corresponding temperature sensors 84 and 86.

If the answer to the query at 136 is FALSE, meaning that a secondary component critical cooling request has not been made, process 130 proceeds to 138 where temperature control unit 82 initiates an active battery heating mode of operation for thermal management system 12, such as illustrated by FIG. 3. Battery pack 22 is then actively heated via heat transfer fluid which is heated by heater 42, such as via circulation through circulation loop 90, until the temperature of battery pack 22 reaches a desired temperature value within a desired operating temperature range (e.g., between the minimum and maximum battery threshold temperatures) or until a secondary component critical cooling request arises. It is noted that, generally speaking, battery pack 22 will be heated to a desired operating temperature before secondary components heat to a critical cooling threshold temperature, particularly when electric powersport vehicle 10 is operating in a cold weather climate.

If the answer to the query at 136 is TRUE, meaning that a secondary component critical request has been made (i.e., at least one secondary component is at a critical cooling temperature), process 130 proceeds to 140 where temperature control unit 82 initiates a passive battery heating mode of operation for thermal management system 12, such as illustrated by FIG. 4. In examples, when operating in passive battery heating mode, battery pack 22 is bypassed such that battery pack 22 passively heats from thermal energy generated during operation, and secondary components, such as motor 14 and electronic motor controller 16, are cooled by circulating thermal transfer fluid there through via heat exchanger 44, such as via circulation through circulation loop 92.

If the query at 134 is FALSE, meaning that a battery heating request has not been issued, process 130 proceeds to 142 where it is queried whether a battery cooling request has been issued by battery management unit 32 (see 118 in FIG. 6). If the answer to the query at 142 is TRUE, meaning that a battery cooling request has been issued, process 130 proceeds to 144 where temperature control unit 82 initiates a full cooling mode of operation for thermal management system 12, such as illustrated by FIG. 5. Battery pack 22 is then cooled by circulating thermal transfer fluid through battery pack 22 and passing thermal transfer fluid through heat exchanger 44, while also cooling secondary components, such as motor 14 and electronic motor controller 16, such as via circulation through circulation loop 94.

If the answer to the query at 142 is FALSE, meaning that a battery cooling request has not been issued, process 130 proceeds to 146. At 146, process 130 queries whether a secondary component cooling request condition exists. Such request is similar to that described at 136, except that a corresponding cooling temperature threshold is less than the critical cooling temperature threshold. In one example, the cooling threshold temperature may be 60 degrees Celsius. In other examples, other suitable cooling threshold temperature values may be employed, such as 70 degree Celsius.

If the answer to the query at 146 is TRUE, process 130 proceeds to 140 where thermal control unit 82 initiates the passive battery heating mode of operation (see FIG. 4), whereby the secondary components, such as motor 14 and electronic controller 16 are cooled, while battery pack 22 is bypassed. If the answer to the query at 146 is FALSE, process 130 proceeds to 148 where thermal control unit 82 initiates a standby mode of operation for thermal management system 20, such as illustrated by FIG. 2, where no thermal transfer fluid is circulated by pump 40.

Figure 8:
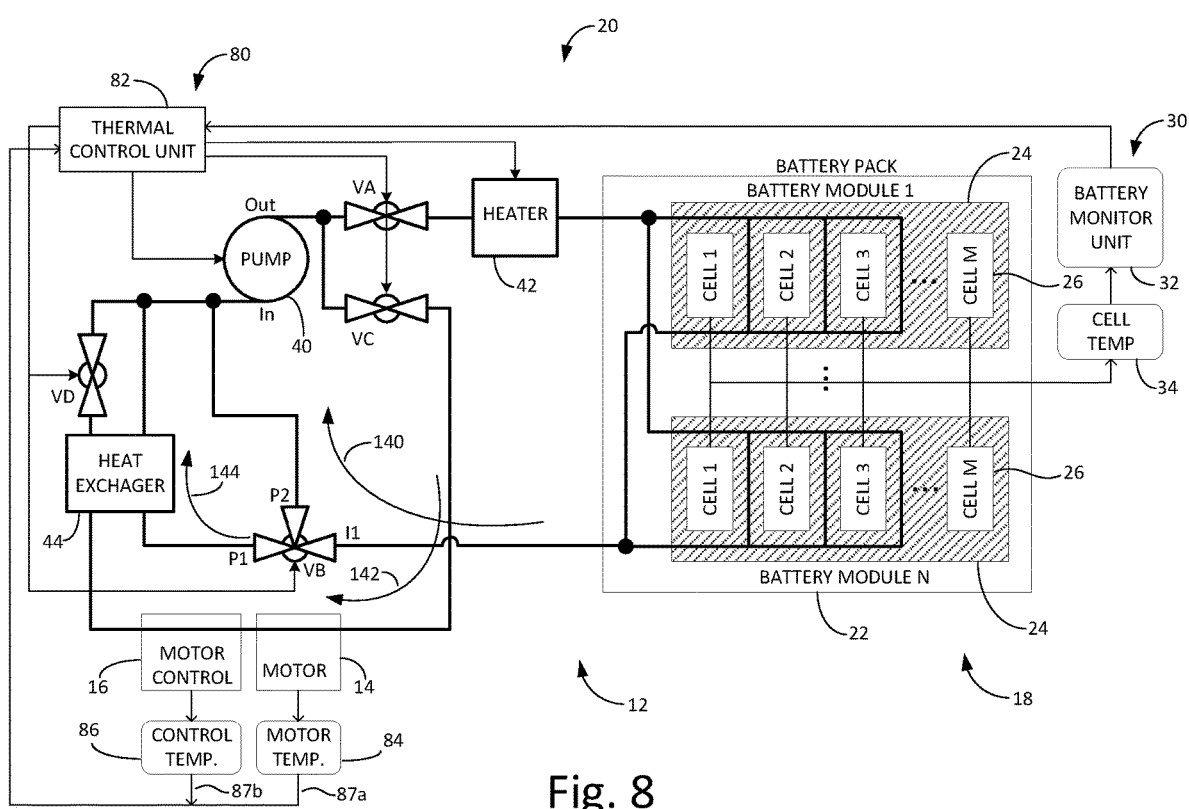
FIG. 8 is a block and schematic diagram illustrating a thermal management system, according to one example of the present disclosure.

FIG. 8 is a block and schematic diagram generally illustrating TMS 20, according to one example of the present disclosure. In other implementations, as illustrated by FIG. 8, TMS 20 may be implemented with a number of type of valves and with fluid pathway configurations different from that set forth by FIGS. 2-5. In alternative examples, TMS 20 may be implemented with dedicated piping systems for heating/cooling of battery pack 12 and for cooling of secondary components, such as motor 14 and motor controller 16, where such dedicated piping systems, in some examples, share pump 40 and heat exchanger 44.

In one alternative implementation, as illustrated by FIG. 8, TMS includes controllable valves VA and VB to control heating and cooling of battery pack 22, and valve VC and VD to control cooling of secondary components, such as electric motor 14 and electronic motor controller 16. For example, in one case, valves VC and VD are closed, while valve VA open and valve VB is positioned to direct flow via an output port P2 so as to form a heating circulation loop 140 when heater 42 is activated. In another case valves VA and VB are closed, while valves VC and VC are open to form a secondary component cooling circulation loop 142 through heat exchanger 44 such that motor 14 and motor controller 16 are cooled while battery pack 22 is bypassed and, thus, enabled to passively heat. In other case, valves VC and VD are closed, while valve VA is open and valve VB is positioned to direct flow via an output port P1 so as to form a battery pack cooling circulation loop 144 through each exchanger 44. In another case, battery cooling circulation loop 144 and secondary component cooling circulation loop 142 may be simultaneously operable.

Any number of alternative valve and piping configurations may be employed within the scope of this disclosure which share pump 40, pump 42, and heat exchanger 44, and which are controllable via battery management system 30 and thermal control system 80 to form cooling and heating and cooling circulation loops for thermal management of battery pack 22 and various secondary components (including motor 14 and motor controller 16).

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A thermal management system for an electric vehicle, the system comprising:
a pump;
a heater;
a heat exchanger; and
a first valve and a second valve, each moveable between at least a first position and a second position; and
a number of fluid pathways fluidically interconnecting the pump, heater, heat exchanger and the first and second valves;
the system operable in a number of modes including:
a first mode with the first valve in the first position and the second valve in the second position to configure the fluid pathways to form a first fluid circulation loop extending through the heater and a battery pack of the vehicle, the pump to circulate fluid heated by the heater through the first circulation loop to heat the battery pack; and
a second mode with the first valve in the second position to configure the fluid pathways to form a second fluid circulation loop extending through an electric motor and motor controller of the vehicle and the heat exchanger, the pump to circulate fluid through the second circulation loop to expel heat from the motor and motor controller via the heat exchanger while bypassing the battery pack.

2. The thermal management system of claim 1, including:
a third mode with the second valve in the first position to configure the fluid pathways form a third fluid circulation loop extending through the heater, battery pack, a motor and motor controller of the vehicle, and the heat exchanger, the pump to circulate fluid through the third circulation loop to expel heat from the battery pack, motor and motor controller via the heat exchanger, the heater being inactivated.

3. The thermal management system of claim 1, the first valve comprising a 3-way valve.

4. A thermal management system for an electric vehicle, the thermal management system comprising:
a pump to circulate a fluid;
a heater to heat the fluid;
a heat exchanger to cool the fluid; and
at least one valve to control circulation of the fluid, the at least one valve being operable in any one of a plurality of modes, the plurality of modes comprising:
a first mode to circulate the fluid through a first circulation loop comprising the pump, the heater and a battery pack of the electric vehicle; and
a second mode to circulate the fluid through a second circulation loop comprising the pump, the heat exchanger and a motor of the electric vehicle, wherein the second circulation loop bypasses the battery pack and the heater.

5. The thermal management system of claim 4, wherein the first circulation loop bypasses the heat exchanger.

6. The thermal management system of claim 4, wherein the first circulation loop bypasses the motor.

7. The thermal management system of claim 4, the plurality of modes comprising a third mode to circulate the fluid through a third circulation loop comprising the pump, the battery pack, the motor and the heat exchanger.

8. The thermal management system of claim 4, wherein the pump is the only pump in the first circulation loop and the second circulation loop.

9. A thermal management system for an electric vehicle, the thermal management system comprising:
  a pump to circulate a fluid;
  a heat exchanger to cool the fluid;
  at least one valve to control circulation of the fluid, the at least one valve being operable in any one of a plurality of modes, the plurality of modes comprising:
    a passive battery heating mode to circulate the fluid through a first circulation loop comprising the pump, the heat exchanger and a motor of the electric vehicle, wherein the first circulation loop bypasses the battery pack; and
    a full cooling mode to circulate the fluid through a second circulation loop comprising the pump, a battery pack of the electric vehicle, the motor and the heat exchanger; and
  a thermal control unit to control the at least one valve, wherein the thermal control unit is to set the at least one valve in the passive battery heating mode when:
    an operating temperature of the battery pack is less than a maximum threshold temperature; and
    an operating temperature of the motor is greater than a cooling temperature threshold.

10. The thermal management system of claim 9, wherein the heat exchanger comprises a fluid-to-fluid heat exchanger.

11. The thermal management system of claim 9, wherein the heat exchanger comprises a fluid-to-air heat exchanger.

12. The thermal management system of claim 9, wherein the heat exchanger comprises a fluid-to-snow heat exchanger.

13. The thermal management system of claim 9, wherein the thermal control unit is to set the at least one valve in the full cooling mode when:
  the operating temperature of the battery pack is greater than the maximum threshold temperature; and
  the operating temperature of the motor is greater than the cooling temperature threshold.

14. The thermal management system of claim 13, wherein the thermal control unit is to set the at least one valve in the full cooling mode when:
  the operating temperature of the battery pack is greater than the maximum threshold temperature; and
  the operating temperature of the motor is less than the cooling temperature threshold.

15. The thermal management system of claim 9, wherein the pump is the only pump in the first circulation loop and the second circulation loop.

16. A thermal management system for an electric vehicle, the thermal management system comprising:
  a pump to circulate a fluid;
  a heat exchanger to cool the fluid;
  a system of fluid pathways, comprising:
    first fluid pathways that perform heat exchange between the fluid and a battery pack of the electric vehicle;
    second fluid pathways that perform heat exchange between the fluid and a motor of the electric vehicle;
    third fluid pathways for delivering the fluid cooled in the heat exchanger to the first fluid pathways;
    fourth fluid pathways for delivering the fluid cooled in the heat exchanger to the second fluid pathways; and
    fifth fluid pathways for delivering the fluid heat-exchanged in the first fluid pathways and the fluid heat-exchanged in the second fluid pathways to the heat exchanger;
  at least one valve to control circulation of the fluid through the system of fluid pathways; and
  a thermal control unit to control the at least one valve, wherein the at least one valve is to control circulation of the fluid to bypass the first fluid pathways when an operating temperature of the battery pack is less than a maximum threshold temperature and an operating temperature of the motor is greater than a cooling temperature threshold.

17. An electric snowmobile comprising the thermal management system of claim 16.

18. The thermal management system of claim 16, wherein the pump is the only pump to circulate the fluid through the system of fluid pathways.

* * * * *